J. F. BEHM.
ICE-PLOW.

No. 191,020. Patented May 22, 1877.

UNITED STATES PATENT OFFICE.

JOHN F. BEHM, OF OMAHA, NEBRASKA.

IMPROVEMENT IN ICE-PLOWS.

Specification forming part of Letters Patent No. 191,020, dated May 22, 1877; application filed March 19, 1877.

*To all whom it may concern:*

Figure 1:
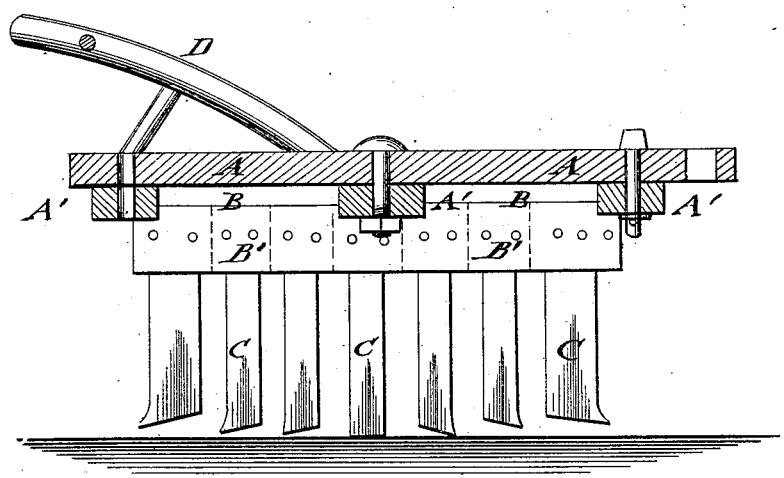
Figure 2:
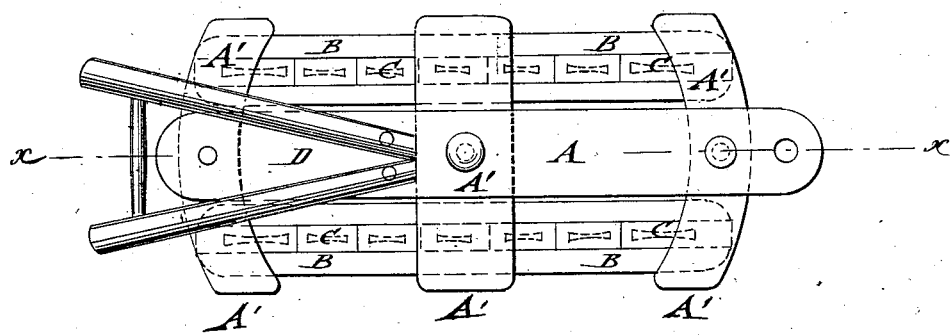

Be it known that I, JOHN F. BEHM, of Omaha, county of Douglas, and State of Nebraska, have invented a new and Improved Ice-Plow, of which the following is a specification:

In the accompanying drawing, Figure 1 represents a side elevation, partly in horizontal section, on line $x$ $x$, Fig. 2, of my improved ice-plow, and Fig. 2 is a top view of the same.

Similar letters of reference indicate corresponding parts.

The invention has reference to an improved ice-plow by which two furrows may be cut, and which may be used in either direction without turning the plow, the same marking also closer or wider, as required.

The invention consists of an ice-plow with cross-pieces, to which two longitudinal rows of cutters are attached, that are arranged symmetrically to a center-cutter, and decreasing in height toward the end cutters. The handles are attached to a centrally-pivoted beam that may be swung around to use the plow in either direction without turning the same.

In the drawing, A represents the longitudinal center beam, that is pivoted to a center cross-piece, A', and bolted to the end cross-pieces A'. To the cross-pieces A' are secured at both sides of the center beam A parallel pieces B, that carry in sockets B' the cutters C. The cutters are arranged in such a manner that the center cutter is the longest, and square at the lower edge, while the remaining cutters are made of less length, and arranged symmetrically to the center cutter. The cutters at both sides of the center cutter are provided with inclined and projecting cutting-edges, for producing in effective manner the furrows, by gradually entering, one after the other, into the ice, and cutting out the required depth of furrow. By using cross-pieces of greater width the cutters may be placed at greater distance, and thereby blocks of greater width obtained. The center beam A swings around the center bolt or fulcrum after the end bolts are withdrawn, so that the position of the handles D may be changed from one end of the plow to the other end, and thereby the plow used in forward and backward direction without turning the same on the ice, the symmetrically-arranged cutters admitting the cutting action both ways. A marker may be attached to the plow to facilitate running of the same at the proper distance from the last furrow.

Having thus described my invention, I claim as new and desire to secure by Letters Patent—

1. An ice-plow, having two parallel rows of cutters, arranged symmetrically with relation to the center cutters, so as to cut two furrows in either direction the plow may be moving, without turning, substantially as specified.

2. An ice-plow, having two or more parallel rows of cutters, which are arranged symmetrically with relation to the center cutters, and are of decreasing length toward the end cutters, said cutters being provided with outwardly-inclined cutting-edges for gradually cutting the required depth of furrows, substantially as specified.

3. The combination, with the lateral cross-pieces of an ice-plow, of a centrally-pivoted beam, and the fastening end bolts, whereby the handles may be swung and secured to either end without reversing the plow, substantially as and for the purpose specified.

JOHN FREDRICK BEHM.

Witnesses:
J. H. BALDWIN,
JAMES DONNELLY.